United States Patent
Floyd et al.

(10) Patent No.: US 10,364,049 B2
(45) Date of Patent: Jul. 30, 2019

(54) SUPPORTING MAINTENANCE OF AIRCRAFT

(71) Applicant: THE BOEING COMPANY, Chicago, IL (US)

(72) Inventors: Joseph Frank Floyd, Seattle, WA (US); Brent Louis Hadley, Kent, WA (US); Robert James Martin, Tukwila, WA (US); John Timothy McCarty, Bonney Lake, WA (US); Patrick J. Eames, Seattle, WA (US)

(73) Assignee: The Boeing Company, Chicago, IL (US)

(*) Notice: Subject to any disclaimer, the term of this patent is extended or adjusted under 35 U.S.C. 154(b) by 34 days.

(21) Appl. No.: 15/839,933

(22) Filed: Dec. 13, 2017

(65) Prior Publication Data

US 2019/0177008 A1   Jun. 13, 2019

(51) Int. Cl.
*B64F 5/40* (2017.01)
*B64F 5/60* (2017.01)
*G06F 3/048* (2013.01)
*G06Q 10/00* (2012.01)
*G06F 16/23* (2019.01)
(Continued)

(52) U.S. Cl.
CPC ............ *B64F 5/40* (2017.01); *B64F 5/60* (2017.01); *G06F 3/048* (2013.01); *G06F 16/212* (2019.01); *G06F 16/23* (2019.01); *G06F 16/28* (2019.01); *G06Q 10/20* (2013.01); *G09G 2370/022* (2013.01)

(58) Field of Classification Search
CPC .... B64F 5/40; B64F 5/60; G06F 16/23; G06F 16/212; G06F 16/28; G06F 3/048; G06Q 10/20; G09G 2370/022
See application file for complete search history.

(56) References Cited

U.S. PATENT DOCUMENTS 6,637,266 B1 * 10/2003 Froom ............... G01M 5/0016
                                                          73/583
9,031,734 B2 * 5/2015 Froom ............... G01M 5/0016
                                                          701/29.3
(Continued)

FOREIGN PATENT DOCUMENTS

EP          3 220 330 A1    9/2017

OTHER PUBLICATIONS

European Search Report dated Jan. 28, 2019; European Application No. 18212161.6-1222.

*Primary Examiner* — Tyler J Lee
(74) *Attorney, Agent, or Firm* — Womble Bond Dickinson (US) LLP

(57) ABSTRACT

A system for supporting maintenance of an aircraft is provided. The system includes a plurality of database importers. The database importers import a plurality of datasets from a plurality of data sources to a database with a composite dataset including data of the plurality of datasets. The system also includes a database-management system (DBMS) to manage the database. The system further includes a client application coupled to the DBMS. The client application receives a user request for a demand for replacement aircraft parts for maintenance during an in-service lifecycle of the aircraft. In response to the user request, the client application predicts and thereby produces a prediction of the demand based on the data retrieved from the composite dataset.

21 Claims, 9 Drawing Sheets

(51) Int. Cl.
  *G06F 16/28*   (2019.01)
  *G06F 16/21*   (2019.01)

(56) References Cited

U.S. PATENT DOCUMENTS

| | | | |
|---|---|---|---|
| 10,144,530 B1* | 12/2018 | Erion | G05B 19/4097 |
| 10,204,323 B1* | 2/2019 | Miller | G06Q 10/20 |
| 2004/0176887 A1* | 9/2004 | Kent | G05B 23/0221 |
| | | | 701/29.5 |
| 2006/0010152 A1* | 1/2006 | Catalano | G06Q 10/06 |
| 2006/0020485 A1* | 1/2006 | Schierholt | G06Q 10/0631 |
| | | | 705/7.12 |
| 2006/0031084 A1* | 2/2006 | Schierholt | G06Q 10/04 |
| | | | 705/7.12 |
| 2008/0154458 A1 | 6/2008 | Brandstetter et al. | |
| 2010/0033308 A1* | 2/2010 | Muirhead | G07C 5/008 |
| | | | 340/10.1 |
| 2010/0106430 A1* | 4/2010 | Balestra | G01M 13/02 |
| | | | 702/35 |
| 2010/0235037 A1* | 9/2010 | Vian | G07C 5/008 |
| | | | 701/31.4 |
| 2010/0235109 A1* | 9/2010 | Zhao | G06Q 10/04 |
| | | | 702/34 |
| 2013/0261876 A1* | 10/2013 | Froom | G01M 5/0016 |
| | | | 701/29.3 |
| 2016/0327937 A1* | 11/2016 | Erion | G05B 19/4093 |
| 2017/0091640 A1* | 3/2017 | Song | G06N 7/005 |
| 2017/0199645 A1* | 7/2017 | Troy | G06F 3/04815 |
| 2017/0270182 A1* | 9/2017 | Floyd | G06Q 10/20 |
| 2017/0283085 A1* | 10/2017 | Kearns | B64D 45/00 |
| 2018/0095133 A1* | 4/2018 | Kealy | G05B 23/02 |

* cited by examiner

VIEW PARTS PLANNING INFORMATION BASED UPON AIRCRAFT, FLEET, LIFE CYCLE, AND/OR PAST OR FUTURE USAGE

AIRCRAFT DETAILS

OPERATOR
[          ]

MODEL
[          ]

EFFECTIVITY
[          ]

LIFE OF AIRCRAFT/FLEET DETAILS

FLIGHT CYCLES
[ 4600    ✕ ]

FLIGHT HOURS
[ 0         ]

[ SEARCH ]

FUTURE CONSUMPTION OR PAST USAGE

FUTURE CONSUMPTION
[✓]

PAST USAGE
[ ]

*FIG. 5A*

SEARCH RESULTS

MODEL NAME

| TASK CARD | PART NUMBER | QUANTITY | FLIGHT CYCLES | EXPECTED REPLACEMENT |
|---|---|---|---|---|
| 21-180-00-02 | 3126456-12 | 1 | 4600 FC | 10/2016 |
| 21-180-00-02 | 5214852-27 | 1 | 4600 FC | 10/2016 |
| 21-180-00-02 | 9467812-23 | 1 | 4600 FC | 10/2016 |
| 21-180-00-02 | 9652140-95 | 1 | 4600 FC | 10/2016 |
| 27-340-00-01 | 3215691-02 | 1 | 4600 FC | 10/2016 |
| 27-340-00-01 | 3698124-36 | 1 | 4600 FC | 10/2016 |
| 27-340-00-02 | 3641136-11 | 1 | 4600 FC | 10/2016 |
| 27-340-00-02 | 8412571-22 | 1 | 4600 FC | 10/2016 |
| 12-008-00-01 | 7852698-54 | 2 | 6000 FC | 11/2018 |
| 12-008-00-02 | 2019736-54 | 2 | 6000 FC | 11/2018 |
| 21-180-00-02 | 1698341-23 | 1 | 9100 FC | 08/2023 |
| 21-180-00-02 | 7852364-01 | 1 | 9100 FC | 08/2023 |
| 21-180-00-02 | 3678521-23 | 1 | 9100 FC | 08/2023 |
| 21-180-00-02 | 2341952-11 | 1 | 9100 FC | 08/2023 |
| 27-340-00-01 | 4562841-30 | 1 | 9100 FC | 08/2023 |

FIG. 5B

SUPPORTING MAINTENANCE OF AIRCRAFT

TECHNOLOGICAL FIELD

The present disclosure relates generally to supporting maintenance of aircraft, in particular, to using a database system to support maintenance of aircraft.

BACKGROUND

Maintenance is regularly performed on aircraft to replace aged aircraft parts with replacement aircraft parts to keep the aircraft in a safe condition for in-service operation. Thus, it is desired to predict the demand for the replacement aircraft parts for maintenance during an in-service lifecycle of the aircraft. However, predicting the demand for the replacement aircraft parts is challenging. The relatively small amount of available historic data on aircraft part replacement (especially for a new model of aircraft) creates one challenge for predicting the demand for replacement aircraft parts. Also, many aged aircraft parts removed from aircraft that have been retired from service are reconditioned and sold as replacement aircraft parts. This adds to the overall pool of available replacement aircraft parts, which reduces the demand for new replacement aircraft parts. The above factors create a nondeterministic environment for predicting the demand for the replacement aircraft parts. Thus, conventional methods of using statistical models may not be effective in predicting the demand for the replacement aircraft parts.

Therefore it would be desirable to have a system and method that take into account at least some of the issues discussed above, as well as other possible issues.

BRIEF SUMMARY

Example implementations of the present disclosure are directed to supporting maintenance of aircraft using a database system to predict the demand for the replacement aircraft parts for maintenance during an in-service lifecycle of the aircraft. In contrast to the existing methods, example implementations provide a system and method for predicting the demand for the replacement aircraft parts based on aircraft utilization information, maintenance planning activity and other available data sources. Based on the available data sources, the prediction of the demand is more accurate.

The present disclosure thus includes, without limitation, the following example implementations.

Some example implementations provide a system for supporting maintenance of an aircraft, the system comprising: a plurality of database importers configured to import a plurality of datasets from a respective plurality of data sources to a database with a composite dataset including data of the plurality of datasets, wherein the composite dataset includes at least aircraft identifier information that describes the aircraft, aircraft utilization information that indicates an in-service state of the aircraft, and data from task cards that describe maintenance tasks performed on the aircraft, an aircraft illustrated parts catalog (AIPC) that describes aircraft parts of the aircraft, and a maintenance planning document (MPD) that describes maintenance intervals for the aircraft; a database-management system (DBMS) configured to manage the database with the composite dataset; and a client application coupled to the DBMS and configured to receive a user request for a demand for replacement aircraft parts for maintenance during an in-service lifecycle of the aircraft, the client application being configured to interpret the user request to produce a query executable by the DBMS to retrieve data of the composite dataset from the database including at least the aircraft identifier information, the aircraft utilization information, and data from the task cards, the AIPC and the MPD, the client application also being configured to predict and thereby produce a prediction of the demand based on the data retrieved from the composite dataset, the prediction including a schedule of maintenance events over the in-service lifecycle of the aircraft in which numbers of aircraft parts of the aircraft are replaced with corresponding numbers of replacement aircraft parts, wherein the client application is configured to produce a graphical user interface (GUI) through which the client application is configured to receive the user request, and through which the client application is configured to display a report including at least the prediction.

In some example implementations of the system of any preceding example implementation, or any combination of preceding example implementations, the composite dataset includes data of the plurality of datasets for a plurality of aircraft operators, aircraft models, effectivity numbers and classifications of maintenance, and wherein the client application being configured to receive the user request includes being configured to receive the user request including an aircraft operator, aircraft model, effectivity number and classification of maintenance from respectively the plurality of aircraft operators, aircraft models, effectivity numbers and classifications of maintenance of the aircraft operators, and wherein the client application being configured to interpret the user request includes being configured to interpret the user request to produce the query that indicates the aircraft operator, aircraft model, effectivity number and classification of maintenance, the query being executable by the DBMS to retrieve data of the composite dataset according thereto.

In some example implementations of the system of any preceding example implementation, or any combination of preceding example implementations, wherein the client application being configured to receive the user request including the classification of maintenance includes being configured to receive the user request including the classification of maintenance from classifications of maintenance including a first classification for routine maintenance indicating a predefined demand for replacement aircraft parts, or a second classification or a third classification for conditional maintenance indicating a demand for replacement aircraft parts based on respectively a condition or usage of the aircraft parts, and wherein the client application being configured to predict and thereby produce the prediction of the demand includes the client application being configured to predict and thereby produce the prediction of the demand further according to the first classification, the second classification or the third classification in the user request.

In some example implementations of the system of any preceding example implementation, or any combination of preceding example implementations, wherein the plurality of database importers being configured to import the plurality of datasets includes being configured to determine numbers of the aircraft parts of the aircraft used in maintenance tasks performed on the aircraft during a past time period based on the data of the plurality of datasets imported according to a predefined time order, and wherein the client application being configured to display the report includes being configured to display the report further including the numbers of the aircraft parts used during the past time period.

In some example implementations of the system of any preceding example implementation, or any combination of preceding example implementations, wherein the client application being configured to predict and thereby produce the prediction of the demand includes being configured to predict and thereby produce the prediction of the demand based on a total in-service lifecycle of the aircraft from the aircraft identifier information, current flight hours or flight cycles of the aircraft from the aircraft utilization information, maintenance tasks involving replacement of the aircraft parts from the task cards, part numbers of the aircraft parts from the AIPC, and maintenance intervals for tasks from the MPD.

In some example implementations of the system of any preceding example implementation, or any combination of preceding example implementations, the composite dataset further includes data of historical aircraft part consumption, and wherein the client application being configured to predict and thereby produce the prediction of the demand includes being configured to predict and thereby produce the prediction of the demand based on historical consumption of the aircraft parts from the data of historical aircraft part consumption.

In some example implementations of the system of any preceding example implementation, or any combination of preceding example implementations, the prediction further includes a likelihood of replacing the aircraft parts with the replacement aircraft parts, the likelihood being indicated by a relevancy index based on a plurality of weighted factors that provide information of the aircraft parts used during a past time period.

Some example implementations provide a method of supporting maintenance of an aircraft, the method comprising: importing a plurality of datasets from a respective plurality of data sources to a database with a composite dataset including data of the plurality of datasets, wherein the composite dataset includes at least aircraft identifier information that describes the aircraft, aircraft utilization information that indicates an in-service state of the aircraft, and data from task cards that describe maintenance tasks performed on the aircraft, an AIPC that describes aircraft parts of the aircraft, and a MPD that describes maintenance intervals for the aircraft; receiving a user request for a demand for replacement aircraft parts for maintenance during an in-service lifecycle of the aircraft; interpreting the user request to produce a query executable by a DBMS managing the database to retrieve data of the composite dataset from the database including at least the aircraft identifier information, the aircraft utilization information, and data from the task cards, the AIPC and the MPD; predicting and thereby producing a prediction of the demand based on the data retrieved from the composite dataset, the prediction including a schedule of maintenance events over the in-service lifecycle of the aircraft in which numbers of aircraft parts of the aircraft are replaced with corresponding numbers of replacement aircraft parts; producing a GUI; and displaying a report including at least the prediction using the GUI.

Some example implementations provide a computer-readable storage medium for supporting maintenance of an aircraft, the computer-readable storage medium being non-transitory and having computer-readable program code stored therein that in response to execution by a processor, causes a computer system to at least: import a plurality of datasets from a respective plurality of data sources to a database with a composite dataset including data of the plurality of datasets, wherein the composite dataset includes at least aircraft identifier information that describes the aircraft, aircraft utilization information that indicates an in-service state of the aircraft, and data from task cards that describe maintenance tasks performed on the aircraft, an AIPC that describes aircraft parts of the aircraft, and a MPD that describes maintenance intervals for the aircraft; receive a user request for a demand for replacement aircraft parts for maintenance during an in-service lifecycle of the aircraft; interpret the user request to produce a query executable by a DBMS managing the database to retrieve data of the composite dataset from the database including at least the aircraft identifier information, the aircraft utilization information, and data from the task cards, the AIPC and the MPD; predict and thereby produce a prediction of the demand based on the data retrieved from the composite dataset, the prediction including a schedule of maintenance events over the in-service lifecycle of the aircraft in which numbers of aircraft parts of the aircraft are replaced with corresponding numbers of replacement aircraft parts; produce a GUI; and display a report including at least the prediction using the GUI.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE DRAWING(S)

Having thus described example implementations of the disclosure in general terms, reference will now be made to the accompanying drawings, which are not necessarily drawn to scale, and wherein:

FIGS. 5A and 5B illustrate the GUI for receiving the user request and displaying the report including the prediction, according to various example implementations;

DETAILED DESCRIPTION

Figure 1:
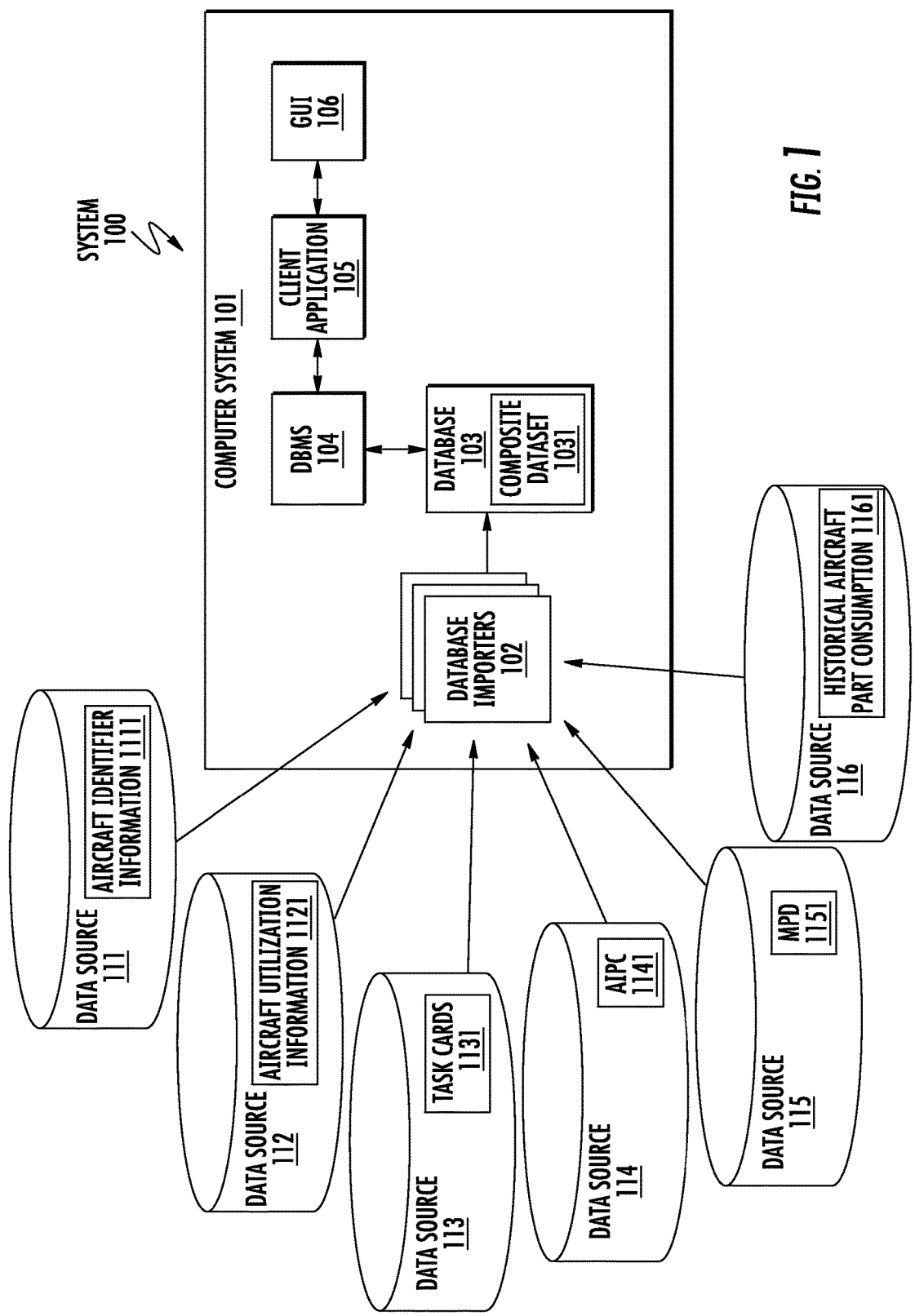
FIG. 1 illustrates a system for supporting maintenance of an aircraft according to example implementations of the present disclosure.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Example implementations of the present disclosure are generally directed to supporting maintenance of aircraft, in particular, to using a database system to support maintenance of aircraft.

FIG. 1 illustrates a system 100 for supporting maintenance of an aircraft according to example implementations of the present disclosure. The system includes a computer system 101 with a processor and a memory storing executable instructions that, in response to execution by the processor, cause the computer system to predict the demand for the replacement aircraft parts for maintenance during an in-service lifecycle of an aircraft.

In some examples, the computer system 101 includes a plurality of database importers 102 configured to import a plurality of datasets from a respective plurality of data sources 111-116 to a database 103. The data base importers may include a software tool to run program code for importing or extracting the plurality of datasets from the plurality of data sources to the database. The data sources may be available from the aircraft operator or from the aircraft manufacturer, e.g., from manuals or documents published by the aircraft operator or the aircraft manufacturer. The data sources may be updated regularly, e.g., monthly. Examples of suitable data sources include aircraft identifier information 1111 that describes the aircraft, aircraft utilization information 1121 that indicates an in-service state of the aircraft, data from task cards 1131 that describe maintenance tasks performed on the aircraft, an aircraft illustrated parts catalog (AIPC) 1141 that describes aircraft parts of the aircraft, a maintenance planning document (MPD) 1151 that describes maintenance intervals for the aircraft, and data of historical aircraft part consumption 1161.

The aircraft identifier information 1111 may include a total in-service lifecycle of the aircraft, associated effectivity number, manufacturing line number, aircraft model number, aircraft serial number or variable number. The aircraft identifier information may include data used to identify tasks and aircraft parts configuration of specific aircraft or fleet of aircraft. If more than one model or several aircraft are selected, the aircraft identifier information can be used to determine applicability of other data sources, e.g., the data sources 113 or 114.

The aircraft utilization information 1121 may include current flight hours or flight cycles (one flight cycle=one takeoff+one landing) of the aircraft. The aircraft utilization information can be used to determine age of the aircraft and calculate when the "next due" maintenance event, e.g., replacing an aircraft part, will occur. The aircraft utilization information may include dynamic information and may change dynamically. Thus, the aircraft utilization information may be updated monthly.

The data from task cards 1131 may include maintenance tasks involving replacement of the aircraft parts. The data from task cards may also include part numbers and operations for aircraft maintenance tasks that are not included in Aircraft Maintenance Manual (AMM). For example, the data from task cards may include heavy maintenance tasks that are performed at longer service life intervals and require the aircraft to be out of service for replacement of parts and in-depth inspections.

The AIPC 1141 may include part numbers of the aircraft parts or aircraft configuration for a model of aircraft in a fleet of an aircraft operator. The AIPC may provide part number applicability, vendor/supplier code, part description (nomenclature) or quantity.

The MPD 1151 may include maintenance intervals for tasks. The MPD may be a high-level aircraft maintenance document that indicates the maintenance intervals of task cards, or the frequency at which the task cards must be performed on a part, system, assemble, or aircraft. Utilizing the MPD in conjunction with the aircraft utilization information 1121 can predict when and how often aircraft parts, equipment or materials are required for aircraft maintenance.

The data of historical aircraft part consumption 1161 may include historical consumption of aircraft parts for different aircraft operators or aircraft models.

In some examples, the database 103 includes a composite dataset 1031 including data of the plurality of datasets from the data sources 111-116. The composite dataset includes at least the aircraft identifier information 1111 that describes the aircraft (imported from the data source 111), the aircraft utilization information 1121 that indicates an in-service state of the aircraft (imported from the data source 112), and the data from task cards 1131 that describe maintenance tasks performed on the aircraft (imported from the data source 113), the AIPC 1141 that describes aircraft parts of the aircraft (imported from the data source 114), and the MPD 1151 that describes maintenance intervals for the aircraft (imported from the data source 115).

In some examples, the computer system 101 includes a database-management system (DBMS) 104 configured to manage the database 103 with the composite dataset 1031, and a client application 105 coupled to the DBMS and configured to receive a user request for a demand for replacement aircraft parts for maintenance during an in-service lifecycle of the aircraft. The client application is configured to interpret the user request to produce a query executable by the DBMS to retrieve data of the composite dataset 1031 from the database 103 including at least the aircraft identifier information 1111, the aircraft utilization information 1121, and data from the task cards 1131, the AIPC 1141 and the MPD 1151.

In some examples, the client application 105 is also configured to predict and thereby produce a prediction of the demand based on the data retrieved from the composite dataset 1031. The prediction includes a schedule of maintenance events over the in-service lifecycle of the aircraft in which numbers of aircraft parts of the aircraft are replaced with corresponding numbers of replacement aircraft parts. The client application is configured to produce a GUI 106 and configured to receive the user request and display a report including at least the prediction through the GUI.

In some examples, the composite dataset 1031 includes data of the plurality of datasets (e.g., the aircraft identifier information 1111, the aircraft utilization information 1121, and data from the task cards 1131, the AIPC 1141 and the MPD 1151) for a plurality of aircraft operators, aircraft models, effectivity numbers and classifications of maintenance. In these examples, the client application 105 is configured to receive the user request including an aircraft operator, aircraft model, effectivity number and classification of maintenance from respectively the plurality of aircraft operators, aircraft models, effectivity numbers and classifications of maintenance of the aircraft operators. The client application is configured to interpret the user request to produce the query that indicates the aircraft operator, aircraft model, effectivity number and classification of maintenance. The query is executable by the DBMS 104 to retrieve data of the composite dataset according to the aircraft operator, aircraft model, effectivity number and classification of maintenance.

In some examples, the client application 105 is configured to receive the user request including the classification of maintenance from classifications of maintenance. The classifications of maintenance include a first classification for routine maintenance indicating a predefined demand for replacement aircraft parts, a second classification for conditional maintenance indicating a demand for replacement aircraft parts based on condition of the aircraft parts, or a third classification for conditional (non-routine) maintenance indicating a demand for replacement aircraft parts based on usage of aircraft parts. For example, the first classification for routine maintenance may include changing a filter every three months. The second classification for conditional maintenance may include changing a filter if the filter is dirty, otherwise the filter is not changed. The third classification for conditional maintenance may include changing a valve upon detecting that the valve is broken or malfunctioned.

In some examples in which the user request includes the classification, the client application 105 is configured to predict and thereby produce the prediction of the demand according to the first classification, the second classification or the third classification in the user request.

The database importers 102 can be configured to import the plurality of datasets according to a predefined time order. According to the predefined order, the aircraft utilization information 1121 is imported before the task cards 1131, data from the task cards is imported before data from the AIPC 1141, and data from the AIPC is imported before data from the MPD 1151. This is because there are dependencies among the datasets. For example, the aircraft utilization information is imported before the task cards because the aircraft utilization information is needed to determine the heavy maintenance tasks in the task cards that may be performed on the aircraft.

In some examples, the database importers 102 are configured to determine numbers of the aircraft parts of the aircraft used in maintenance tasks performed on the aircraft during a past time period. In some examples, the determination is based on the data of the plurality of datasets imported according to the predefined time order. For example, the database importers 102 can determine how many aircraft parts were used in past maintenance events based on the data of the plurality of datasets imported according to a predefined time order, e.g., the time order described above. The determination may be performed after the datasets are imported. The determination may be the last step of the data import. The client application 105 is configured to display the report further including the numbers of the aircraft parts used during the past time period.

In some examples, the client application 105 is configured to predict and thereby produce the prediction of the demand based on a total in-service lifecycle of the aircraft from the aircraft identifier information 1111, current flight hours or flight cycles of the aircraft from the aircraft utilization information 1121, maintenance tasks involving replacement of the aircraft parts from the task cards 1131, part numbers of the aircraft parts from the AIPC 1141, and maintenance intervals for tasks from the MPD 1151.

In some examples, the composite dataset 1031 further includes data of historical aircraft part consumption 1161 (imported from data source 116). The client application 105 is configured to predict and thereby produce the prediction of the demand based on historical consumption of the aircraft parts from the data of historical aircraft part consumption. In some examples, the database importers 102 are configured to determine numbers of the aircraft parts of the aircraft used in maintenance tasks performed on the aircraft during a past time period based on the data of historical aircraft part consumption.

In some examples, the prediction further includes a likelihood of replacing the aircraft parts with the replacement aircraft parts. The likelihood is indicated by a relevancy index based on a plurality of weighted factors that provide information of the aircraft parts used during a past time period. For example, the relevancy index can be an integer from 0-15, where 0 indicates a lowest likelihood of replacing the aircraft parts and 16 indicates a highest likelihood of replacing the aircraft parts. The relevancy index can be a summation of nominal factors. For example, past consumption of the aircraft parts can be a nominal factor with value 7, past sales of the aircraft parts can be a nominal factor with value 5 and past in-service data can be a nominal factor with value 1. In this example, the relevancy index (the summation of the three nominal factors) is 13. In some examples, each of the nominal factors has a corresponding weight and the relevancy index is the weighted summation of the nominal factors.

Figure 2:
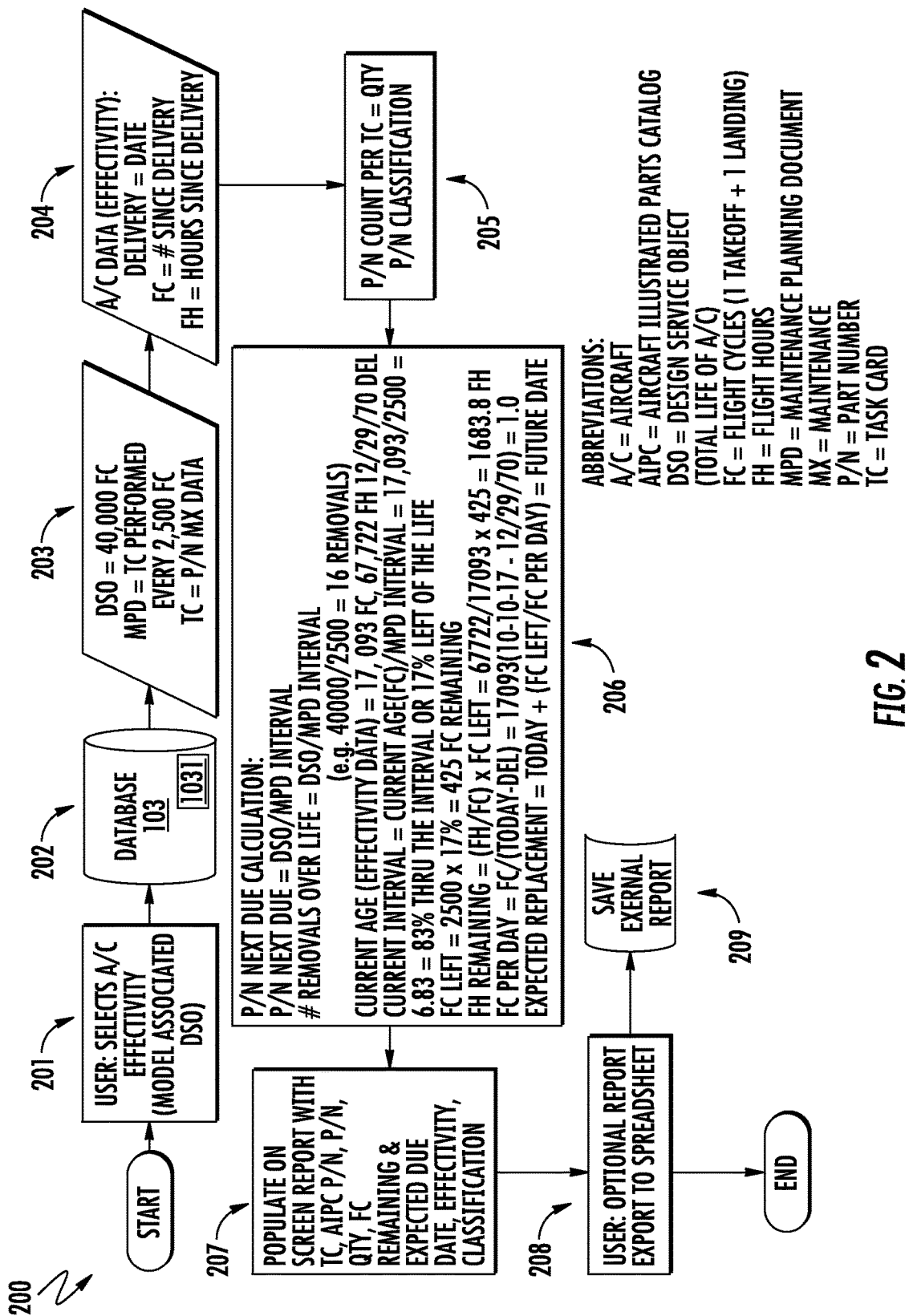
FIG. 2 is a flowchart illustrating various steps in a method of generating a schedule of maintenance events over the in-service lifecycle of an aircraft, according to various example implementations.

FIG. 2 is a flowchart illustrating various steps in a method 200 of generating a schedule of maintenance events over the in-service lifecycle of an aircraft, according to various example implementations. As shown, at block 201, a user selects an effectivity number of the aircraft or model of the aircraft. The model of the aircraft indicates an associated design service objective (DSO) which includes information of the total life (total in-service lifecycle) of the aircraft. The user selection (i.e., the user request described above for FIG. 1) is provided to the database 103 at block 202 via the client application 105.

At block 203, data of the composite dataset 1031 in the database 103 are retrieved by the DBMS 104 in response to the user request. The retrieved data include the DSO including information of the total life of the aircraft. For example, the total life of the aircraft is 40,000 flight cycles (FCs). In some examples, the DSO is retrieved from the aircraft identifier information 1111. The retrieved data also include the MPD 1151 indicating maintenance intervals of task cards for the aircraft. For example, a task card should be performed every 2500 FCs. The retrieved data may also include maintenance tasks involving replacement of the aircraft parts retrieved from the task cards 1131. The retrieved data may also include maintenance data for aircraft parts based on part numbers retrieved from the AIPC 1141.

Data of the composite dataset 1031 in the database 103 are also retrieved at block 204. For example, data of aircraft including aircraft delivery date, number of FC or number of flight hours (FH) since delivery can be retrieved from the aircraft identifier information 1111 or aircraft utilization information 1121. At block 205, the quantity (QTY) of aircraft parts for each part number in each task card is determined from the task cards 1131 and the classification of maintenance is determined from the user request.

At block 206, the next due date of replacing an aircraft part based on the part number for the aircraft is calculated or predicted by the client application 105. As shown, for example, the total number of maintenance events (removals of the aircraft part from the aircraft) is DSO/MPD interval=40000/2500=16. Thus, the aircraft needs to replace the aircraft part 16 times during the in-service lifecycle of the aircraft. The current age of the aircraft is 17,093 FCs. Thus, after 425 FCs, the aircraft needs to have the next maintenance event to replace the aircraft part. The FC per day for the aircraft is 1 FC/day. Thus, the next due date is 425 days from the current date. Future due dates after the next due date can be calculated similarly.

In some examples, at block 206, a schedule of maintenance events (multiple future due dates) over the in-service lifecycle of the aircraft are calculated. Using the schedule, numbers of aircraft parts of the aircraft are replaced with corresponding numbers of replacement aircraft parts.

At block 207, a report is generated to show the prediction including the schedule of maintenance events over the in-service lifecycle of the aircraft to the user via the GUI 106. The report may include the remaining time for future maintenance events or the expected due dates for future maintenance events. The user may select to export the report to spreadsheet at block 208 or save the report as an external report at block 209.

Figure 3:
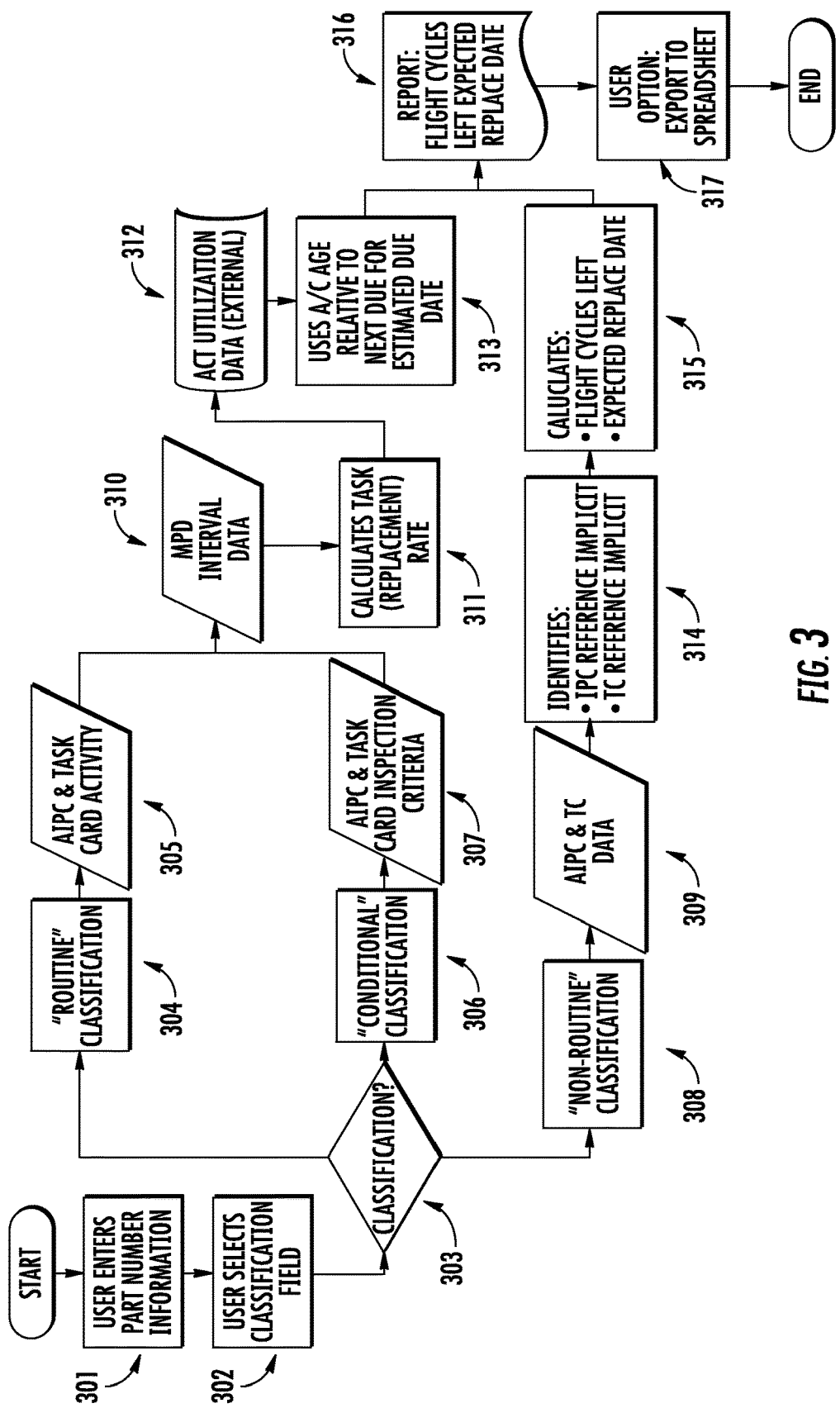
FIG. 3 is a flowchart illustrating various steps in a method of predicting a demand for replacement aircraft parts for maintenance of an aircraft based on classifications of maintenance, according to various example implementations.

FIG. 3 is a flowchart illustrating various steps in a method 300 of predicting a demand for replacement aircraft parts for maintenance of an aircraft based on classifications of maintenance, according to various example implementations. As shown, a user enters part number information of the aircraft parts at block 301 and selects the classification of maintenance at block 302. At block 303, a decision is made for the selected classification of maintenance per the user selection (i.e., the user request described above for FIG. 1).

If the first classification for routine maintenance is selected, the method 300 proceeds to block 304. At blocks 305 and 310, data of the composite dataset 1031 in the database 103, e.g., the data from task cards 1131, the AIPC 1141 or the MPD 1151, are retrieved by the DBMS 104 in response to the user request. At block 311, replacement rate is calculated. The calculated replacement rate at block 311 and the aircraft utilization information 1121 retrieved at block 312 are provided to the block 313 to calculate the next due date or future due dates, as described above for block 206. Report is generated at block 316 and exported to spreadsheet at block 317.

If the second classification for conditional maintenance based on a condition of the aircraft parts is selected, the method 300 proceeds to block 306. At block 307, in addition to the data from task cards 1131 and the AIPC 1141, inspection criteria are retrieved to determine whether the conditional maintenance should be performed. Then the method 300 proceeds from block 307 to block 310. The steps from 310 to 317 are the same as described above for the first classification.

If the third classification for non-routine maintenance based on a usage of the aircraft parts is selected, the method 300 proceeds to block 308. Similarly as above, at block 309, the data from task cards 1131 and the AIPC 1141 are retrieved. At block 314, IPC and task card (TC) reference implicit are identified by the DBMS 104. At block 315, expected replace date is calculated, as described above for block 206. Then the method 300 proceeds from block 315 to block 316. The steps from 316 to 317 are the same as described above for the first or the second classification.

Figure 4:
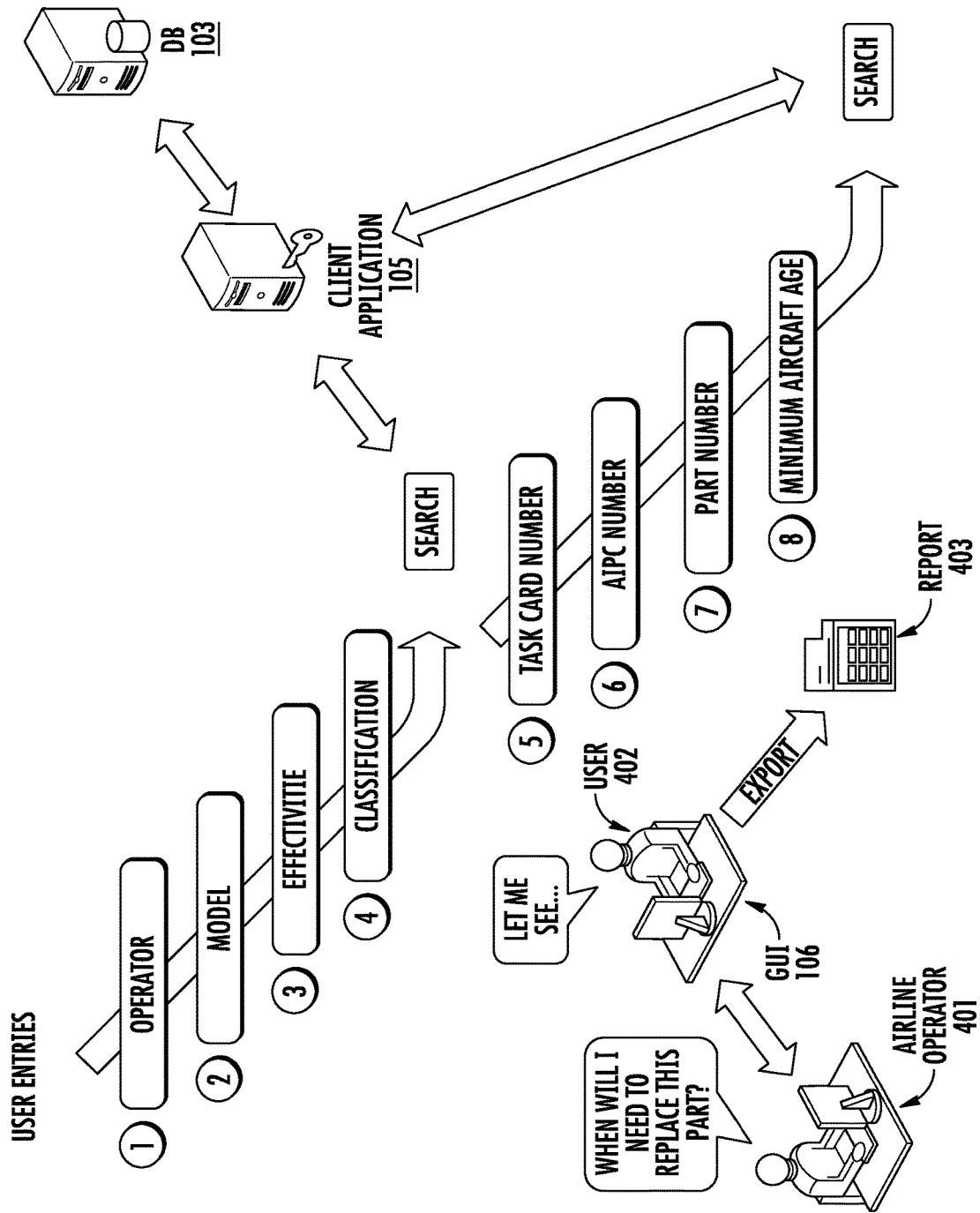
FIG. 4 illustrates predicting and displaying a report including a prediction of the demand using a graphical user interface (GUI) in response to a user request, according to various example implementations.

FIG. 4 illustrates predicting and displaying a report including a prediction of the demand for replacement aircraft parts using the GUI 106 in response to a user request, according to various example implementations. As shown, an airplane operator 401 can send a message to a user 402 of the computer system 101 requesting a prediction of replacement due dates or quantity needed. The user can use the GUI 106 to input a request including an aircraft operator, aircraft model, effectivity number and classification of maintenance. The user request may also include task card number, AIPC number, part number or minimum aircraft age. The client application 105 can interpret the user request to retrieve data from the database 103 and produce the prediction based on the data retrieved, as described above. The user can use the GUI 106 to generate a report 403 including the prediction.

FIGS. 5A and 5B illustrate the GUI 106 for receiving the user request and displaying the report including the prediction, according to various example implementations. As shown in FIG. 5A, the GUI can be a web interface. The user can input an aircraft operator, aircraft model, effectivity number, flight cycles or flight hours in the user request. The user can also select to predict future consumption or determine past usage. After providing the user request, the user can implement the search via the GUI. As shown in FIG. 5B, the search results can show expected replacement due dates or quantity needed of the replacement aircraft parts for the aircraft model.

Figure 6:
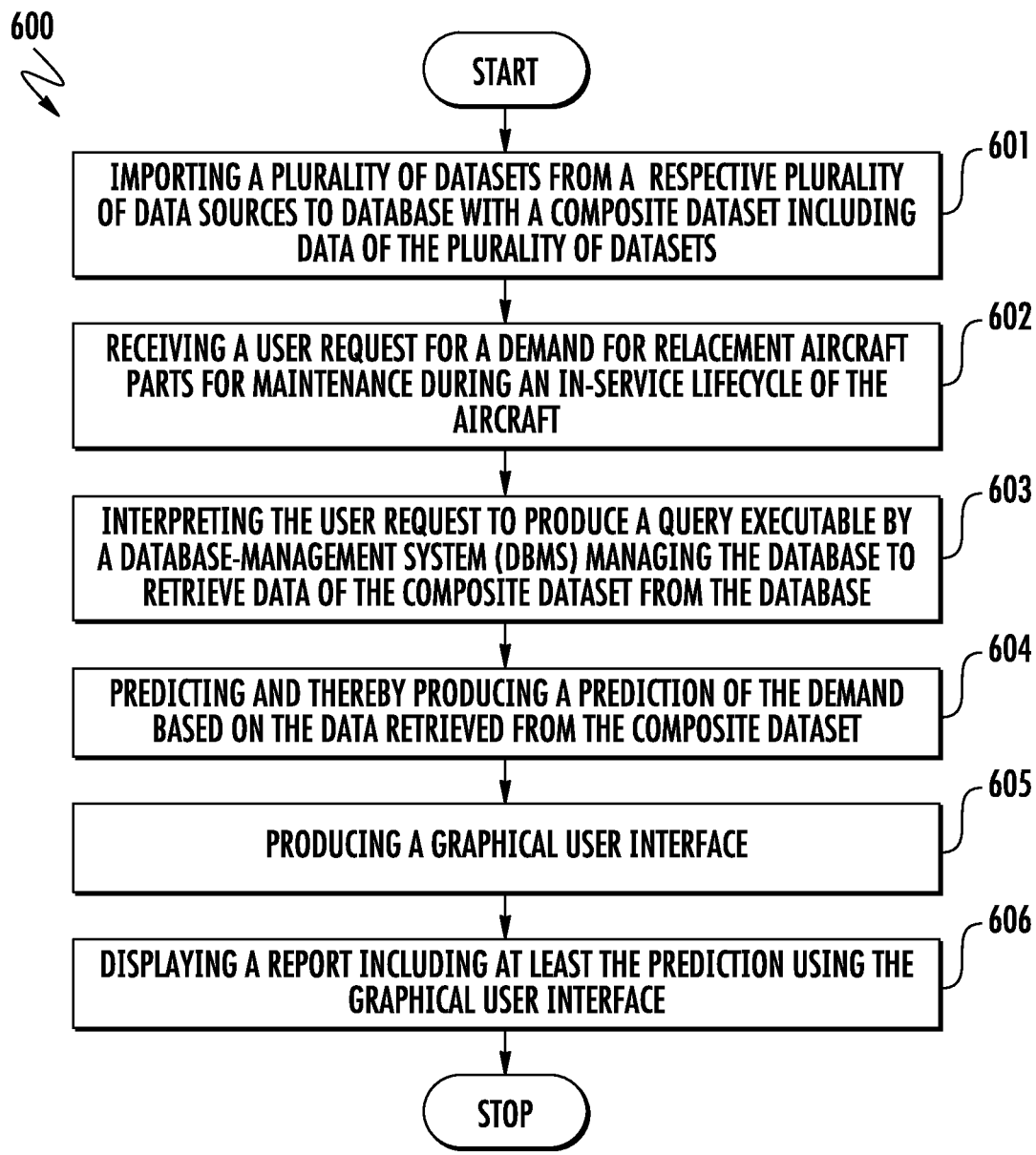
FIG. 6 is a flowchart illustrating various steps in a method of supporting maintenance of an aircraft, according to various example implementations.

FIG. 6 is a flowchart illustrating various steps in a method 600 of supporting maintenance of an aircraft, according to various example implementations. As shown, at block 601, the method 600 includes importing a plurality of datasets from a respective plurality of data sources, e.g., the data sources 111-116, to a database 103 with a composite dataset 1031 including data of the plurality of datasets, wherein the composite dataset includes at least aircraft identifier information 1111 that describes the aircraft, aircraft utilization information 1121 that indicates an in-service state of the aircraft, and data from task cards 1131 that describe maintenance tasks performed on the aircraft, an AIPC 1141 that describes aircraft parts of the aircraft, and a MPD 1151 that describes maintenance intervals for the aircraft.

At block 602, the method 600 includes receiving a user request for a demand for replacement aircraft parts for maintenance during an in-service lifecycle of the aircraft. At block 603, the method includes interpreting the user request to produce a query executable by a DBMS 104 managing the database 103 to retrieve data of the composite dataset 1031 from the database including at least the aircraft identifier information 1111, the aircraft utilization information 1121, and data from the task cards 1131, the AIPC 1141 and the MPD 1151.

At block 604, the method 600 includes predicting and thereby producing a prediction of the demand based on the data retrieved from the composite dataset 1031, the prediction including a schedule of maintenance events over the in-service lifecycle of the aircraft in which numbers of aircraft parts of the aircraft are replaced with corresponding numbers of replacement aircraft parts. The method also includes producing a GUI 106 at block 605 and displaying a report including at least the prediction using the GUI at block 606.

According to example implementations of the present disclosure, the computer system 101 may be implemented by various means. Means for implementing the computer system may include hardware, alone or under direction of one or more computer programs from a computer-readable storage medium. In some examples, one or more apparatuses may be configured to function as or otherwise implement the computer system shown and described herein. In examples involving more than one apparatus, the respective apparatuses may be connected to or otherwise in communication with one another in a number of different manners, such as directly or indirectly via a wired or wireless network or the like.

Figure 7:
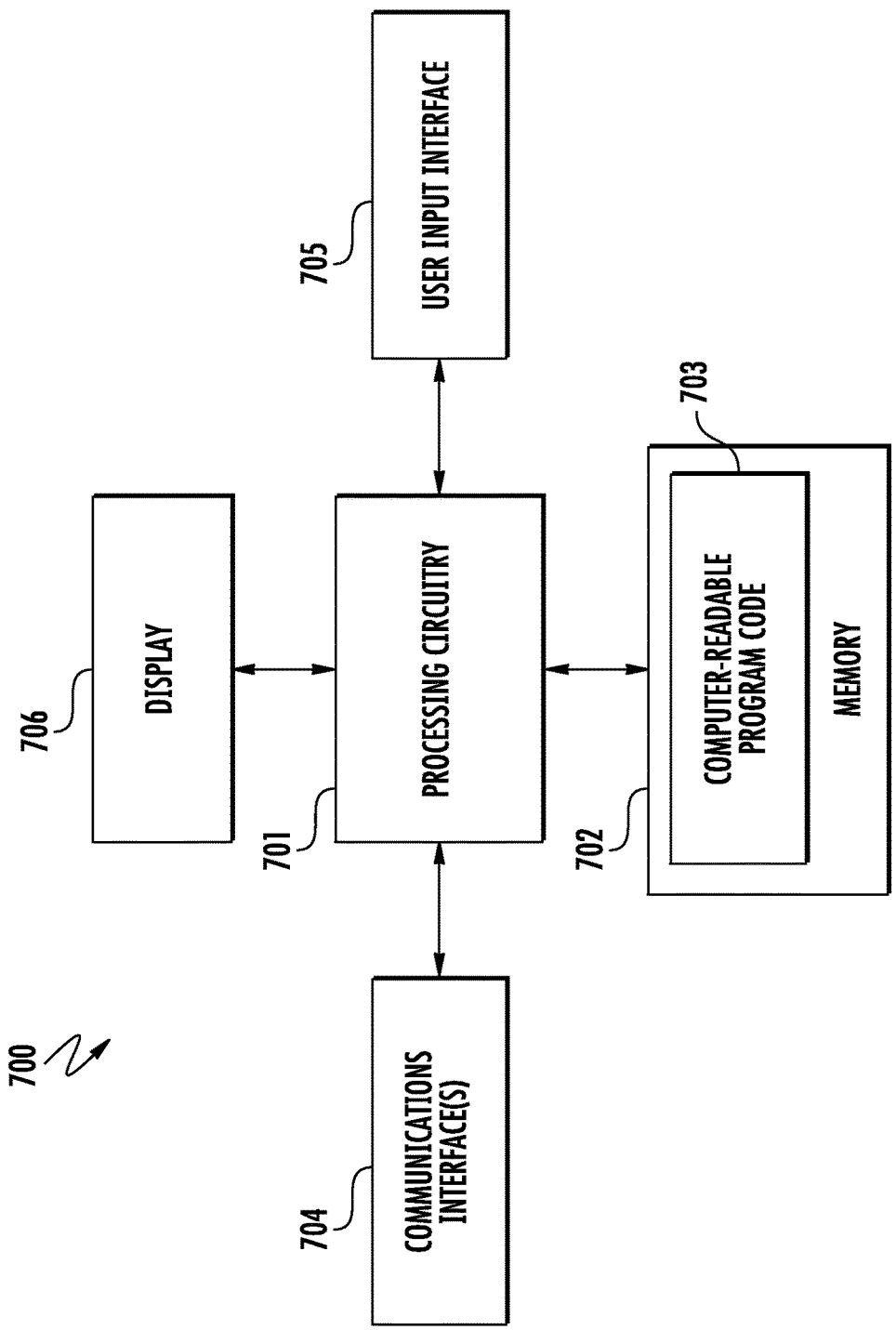
FIG. 7 illustrates an apparatus according to some example implementations.

FIG. 7 illustrates an apparatus 700 according to some example implementations. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, processor 701 (e.g., processing circuitry) connected to a memory 702 (e.g., storage device). In some examples, the apparatus 700 includes the computer system 101.

The processor 701 may be composed of one or more processors alone or in combination with one or more memories. The processor is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 702 (of the same or another apparatus).

The processor 701 may be a number of processors, a multi-core processor or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more ASICs, FPGAs or the like. Thus, although the processor may be capable of executing a computer program to perform one or more functions, the processor of various examples may be capable of performing one or more functions without the aid of a computer program. In either instance, the processor may be appropriately programmed to perform functions or operations according to example implementations of the present disclosure.

The memory 702 is generally any piece of computer hardware that is capable of storing information such as, for example, data, computer programs (e.g., computer-readable program code 703) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 702, the processor 701 may also be connected to one or more interfaces for displaying, transmitting and/or receiving information. The interfaces may include a communications interface 704 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 705 and/or one or more user input interfaces 706 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like. In some examples, the user interfaces include the GUI 106.

As indicated above, program code instructions may be stored in memory, and executed by processor that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. In this manner, an apparatus 700 may include a processor 701 and a computer-readable storage medium or memory 702 coupled to the processor, where the processor is configured to execute computer-readable program code 703 stored in the memory. It will also be understood that one or more functions, and combinations of functions, may be implemented by special purpose hardware-based computer systems and/or processors which perform the specified functions, or combinations of special purpose hardware and program code instructions.

Figure 8:
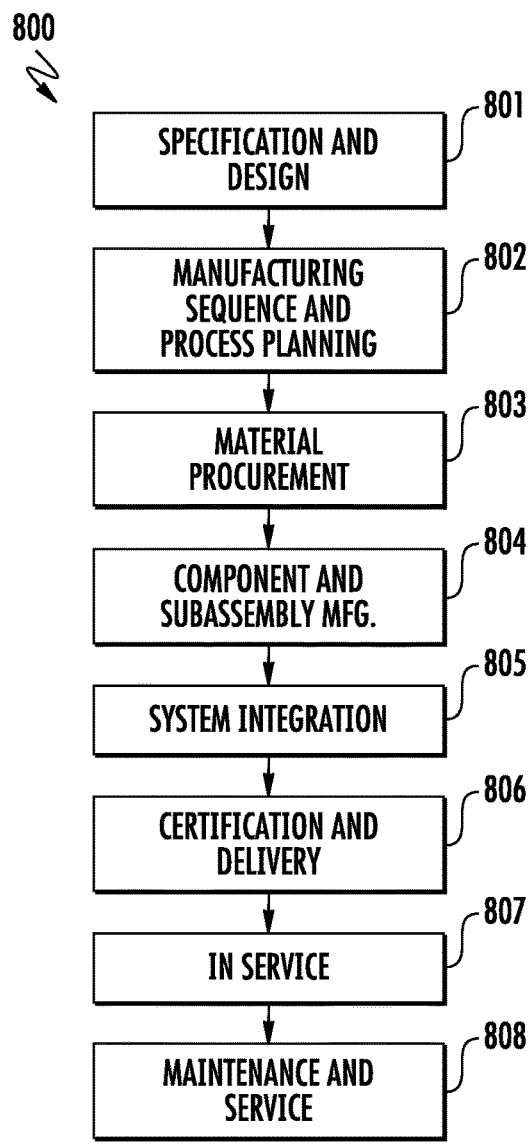
FIG. 8 is an illustration of a flow diagram of aircraft production and service methodology according to one example implementation.
Figure 9:
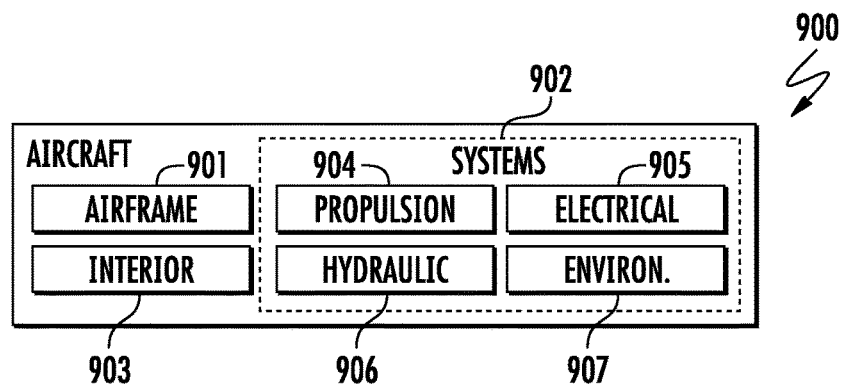
FIG. 9 is an illustration of a block diagram of an aircraft according to one example implementation.

Example implementations of the disclosure may find use in a variety of potential applications, particularly in the transportation industry, including for example, aerospace, marine and automotive applications. Thus, referring now to FIGS. 8 and 9, example implementations may be used in the context of an aircraft manufacturing and service method 800 as shown in FIG. 8, and an aircraft 900 as shown in FIG. 9. During pre-production, the example method 800 may include specification and design 801 of the aircraft 900, manufacturing sequence and processing planning 802 and material procurement 803. During production, component and subassembly manufacturing 804 and system integration 805 of the aircraft 900 takes place. Thereafter, the aircraft 900 may go through certification and delivery 806 in order to be placed in service 807. While in service 807 by a customer, the aircraft 900 may be scheduled for maintenance and service 808 (which may also include modification, reconfiguration, refurbishment or the like).

The disclosed method and system for supporting maintenance of an aircraft may be used before or during the maintenance and service 808. For example, before or during the maintenance and service 808, the disclosed method and system may be used to accurately predict the demand of aircraft parts and assist in pre-planning and ordering of the aircraft parts to reduce the cost of purchasing the aircraft parts. More specifically, for example, a system and method of maintaining an aircraft may include predicting demand for replacement aircraft parts for maintenance during an in-service lifecycle of the aircraft, procuring the replacement aircraft parts according to the demand, and performing maintenance on the aircraft using the replacement parts that are procured.

Each of the processes of the example method 800 may be performed or carried out by a system integrator, third party and/or operator (e.g., customer). For the purposes of this description, a system integrator may include for example any number of aircraft manufacturers and major-system subcontractors; a third party may include for example any number of vendors, subcontractors and suppliers; and an operator may include for example an airline, leasing company, military entity, service organization or the like.

As shown in FIG. 9, an example aircraft 900 produced by the example method 800 may include an airframe 901 with a plurality of systems 902 and an interior 903. Examples of high-level systems 902 include one or more of a propulsion system 904, electrical system 905, hydraulic system 906, environmental system 907 or the like. Any number of other systems 902 may be included. Example implementations of the present disclosure may be used to support maintenance of any one or more of these high-level systems, and include predicting demand for replacement parts for any one or more high-level systems. Although an aerospace example is shown, the principles of the disclosure may be applied to other industries, such as the marine and automotive industries.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A system for supporting maintenance of an aircraft, comprising:

a plurality of database importers configured to import a plurality of datasets from a respective plurality of data sources to a database with a composite dataset including data of the plurality of datasets, wherein the composite dataset includes at least aircraft identifier information that describes the aircraft, aircraft utilization information that indicates an in-service state of the aircraft, and data from task cards that describe maintenance tasks performed on the aircraft, an aircraft illustrated parts catalog (AIPC) that describes aircraft parts of the aircraft, and a maintenance planning document (MPD) that describes maintenance intervals for the aircraft;

a database-management system (DBMS) configured to manage the database with the composite dataset; and a client application coupled to the DBMS and configured to receive a user request for a demand for replacement aircraft parts for maintenance during an in-service lifecycle of the aircraft, the client application being configured to interpret the user request to produce a query executable by the DBMS to retrieve data of the composite dataset from the database including at least the aircraft identifier information, the aircraft utilization information, and data from the task cards, the AIPC and the MPD, the client application also being configured to predict and thereby produce a prediction of the demand based on the data retrieved from the composite dataset, the prediction including a schedule of maintenance events over the in-service lifecycle of the aircraft in which numbers of aircraft parts of the aircraft are replaced with corresponding numbers of replacement aircraft parts, wherein the client application is configured to produce a graphical user interface through which the client application is configured to receive the user request, and through which the client application is configured to display a report including at least the prediction.

2. The system of claim 1, wherein the composite dataset includes data of the plurality of datasets for a plurality of aircraft operators, aircraft models, effectivity numbers and classifications of maintenance, and the client application being configured to receive the user request includes being configured to receive the user request including an aircraft operator, aircraft model, effectivity number and classification of maintenance from respectively the plurality of aircraft operators, aircraft models, effectivity numbers and classifications of maintenance of the aircraft operators, and wherein the client application being configured to interpret the user request includes being configured to interpret the user request to produce the query that indicates the aircraft operator, aircraft model, effectivity number and classification of maintenance, the query being executable by the DBMS to retrieve data of the composite dataset according thereto.

3. The system of claim 2, wherein the client application being configured to receive the user request including the classification of maintenance includes being configured to receive the user request including the classification of maintenance from classifications of maintenance including a first classification for routine maintenance indicating a predefined demand for replacement aircraft parts, or a second classification or a third classification for conditional maintenance indicating a demand for replacement aircraft parts based on respectively a condition or usage of the aircraft parts, and wherein the client application being configured to predict and thereby produce the prediction of the demand includes the client application being configured to predict and thereby produce the prediction of the demand further according to the first classification, the second classification or the third classification in the user request.

4. The system of claim 1, wherein the plurality of database importers being configured to import the plurality of datasets includes being configured to determine numbers of the aircraft parts of the aircraft used in maintenance tasks performed on the aircraft during a past time period based on the data of the plurality of datasets imported according to a predefined time order, and wherein the client application being configured to display the report includes being configured to display the report further including the numbers of the aircraft parts used during the past time period.

5. The system of claim 1, wherein the client application being configured to predict and thereby produce the prediction of the demand includes being configured to predict and thereby produce the prediction of the demand based on a total in-service lifecycle of the aircraft from the aircraft identifier information, current flight hours or flight cycles of the aircraft from the aircraft utilization information, maintenance tasks involving replacement of the aircraft parts from the task cards, part numbers of the aircraft parts from the AIPC, and maintenance intervals for tasks from the MPD.

6. The system of claim 1, wherein the composite dataset further includes data of historical aircraft part consumption, and wherein the client application being configured to predict and thereby produce the prediction of the demand includes being configured to predict and thereby produce the prediction of the demand based on historical consumption of the aircraft parts from the data of historical aircraft part consumption.

7. The system of claim 1, wherein the prediction further includes a likelihood of replacing the aircraft parts with the replacement aircraft parts, the likelihood being indicated by a relevancy index based on a plurality of weighted factors that provide information of the aircraft parts used during a past time period.

8. A method of supporting maintenance of an aircraft, comprising:

importing a plurality of datasets from a respective plurality of data sources to a database with a composite dataset including data of the plurality of datasets, wherein the composite dataset includes at least aircraft identifier information that describes the aircraft, aircraft utilization information that indicates an in-service state of the aircraft, and data from task cards that describe maintenance tasks performed on the aircraft, an aircraft illustrated parts catalog (AIPC) that describes aircraft parts of the aircraft, and a maintenance planning document (MPD) that describes maintenance intervals for the aircraft;

receiving a user request for a demand for replacement aircraft parts for maintenance during an in-service lifecycle of the aircraft;

interpreting the user request to produce a query executable by a database-management system (DBMS) managing the database to retrieve data of the composite dataset from the database including at least the aircraft identifier information, the aircraft utilization information, and data from the task cards, the AIPC and the MPD;

predicting and thereby producing a prediction of the demand based on the data retrieved from the composite dataset, the prediction including a schedule of maintenance events over the in-service lifecycle of the aircraft in which numbers of aircraft parts of the aircraft are replaced with corresponding numbers of replacement aircraft parts;

producing a graphical user interface; and displaying a report including at least the prediction using the graphical user interface.

9. The method of claim 8, wherein the composite dataset includes data of the plurality of datasets for a plurality of aircraft operators, aircraft models, effectivity numbers and classifications of maintenance, and wherein receiving the user request includes receiving the user request including an aircraft operator, aircraft model, effectivity number and classification of maintenance from respectively the plurality of aircraft operators, aircraft models, effectivity numbers and classifications of maintenance of the aircraft operators, and wherein interpreting the user request includes interpreting the user request to produce the query that indicates the aircraft operator, aircraft model, effectivity number and classification of maintenance, the query being executable by the DBMS to retrieve data of the composite dataset according thereto.

10. The method of claim 9, wherein receiving the user request including the classification of maintenance includes receiving the user request including the classification of maintenance from classifications of maintenance including a first classification for routine maintenance indicating a predefined demand for replacement aircraft parts, or a second classification or a third classification for conditional maintenance indicating a demand for replacement aircraft parts based on respectively a condition or usage of the aircraft parts, and wherein predicting and thereby producing the prediction of the demand includes predicting and thereby producing the prediction of the demand further according to the first classification, the second classification or the third classification in the user request.

11. The method of claim 8, wherein importing the plurality of datasets includes determining numbers of the aircraft parts of the aircraft used in maintenance tasks performed on the aircraft during a past time period based on the data of the plurality of datasets imported according to a predefined time order, and wherein displaying the report includes displaying the report further including the numbers of the aircraft parts used during the past time period.

12. The method of claim 8, wherein predicting and thereby producing the prediction of the demand includes predicting and thereby producing the prediction of the demand based on a total in-service lifecycle of the aircraft from the aircraft identifier information, current flight hours or flight cycles of the aircraft from the aircraft utilization information, maintenance tasks involving replacement of the aircraft parts from the task cards, part numbers of the aircraft parts from the AIPC, and maintenance intervals for tasks from the MPD.

13. The method of claim 8, wherein the composite dataset further includes data of historical aircraft part consumption, and wherein predicting and thereby producing the prediction of the demand includes predicting and thereby producing the prediction of the demand based on historical consumption of the aircraft parts from the data of historical aircraft part consumption.

14. The method of claim 8, wherein the prediction further includes a likelihood of replacing the aircraft parts with the replacement aircraft parts, the likelihood being indicated by a relevancy index based on a plurality of weighted factors that provide information of the aircraft parts used during a past time period.

15. A computer-readable storage medium for supporting maintenance of an aircraft, the computer-readable storage medium being non-transitory and having computer-readable program code stored therein that in response to execution by a processor, causes a computer system to at least:

import a plurality of datasets from a respective plurality of data sources to a database with a composite dataset including data of the plurality of datasets, wherein the composite dataset includes at least aircraft identifier information that describes the aircraft, aircraft utilization information that indicates an in-service state of the aircraft, and data from task cards that describe maintenance tasks performed on the aircraft, an aircraft illustrated parts catalog (AIPC) that describes aircraft parts of the aircraft, and a maintenance planning document (MPD) that describes maintenance intervals for the aircraft;

receive a user request for a demand for replacement aircraft parts for maintenance during an in-service lifecycle of the aircraft;

interpret the user request to produce a query executable by a database-management system (DBMS) managing the database to retrieve data of the composite dataset from the database including at least the aircraft identifier information, the aircraft utilization information, and data from the task cards, the AIPC and the MPD;

predict and thereby produce a prediction of the demand based on the data retrieved from the composite dataset, the prediction including a schedule of maintenance events over the in-service lifecycle of the aircraft in which numbers of aircraft parts of the aircraft are replaced with corresponding numbers of replacement aircraft parts;

produce a graphical user interface; and display a report including at least the prediction using the graphical user interface.

16. The computer-readable storage medium of claim 15, wherein the composite dataset includes data of the plurality of datasets for a plurality of aircraft operators, aircraft models, effectivity numbers and classifications of maintenance, and wherein the computer system being caused to receive the user request includes being caused to receive the user request including an aircraft operator, aircraft model, effectivity number and classification of maintenance from respectively the plurality of aircraft operators, aircraft models, effectivity numbers and classifications of maintenance of the aircraft operators, and wherein the computer system being caused to interpret the user request includes being caused to interpret the user request to produce the query that indicates the aircraft operator, aircraft model, effectivity number and classification of maintenance, the query being executable by the DBMS to retrieve data of the composite dataset according thereto.

17. The computer-readable storage medium of claim 16, wherein the computer system being caused to receive the user request including the classification of maintenance includes being caused to receive the user request including the classification of maintenance from classifications of maintenance including a first classification for routine maintenance indicating a predefined demand for replacement aircraft parts, or a second classification or a third classification for conditional maintenance indicating a demand for replacement aircraft parts based on respectively a condition or usage of the aircraft parts, and wherein the computer system being caused to predict and thereby produce the prediction of the demand includes being caused to predict and thereby produce the prediction of the demand further according to the first classification, the second classification or the third classification in the user request.

18. The computer-readable storage medium of claim 15, wherein the computer system being caused to import the plurality of datasets includes being caused to determine numbers of the aircraft parts of the aircraft used in maintenance tasks performed on the aircraft during a past time period based on the data of the plurality of datasets imported according to a predefined time order, and
    wherein the computer system being caused to display the report includes being caused to display the report further including the numbers of the aircraft parts used during the past time period.

19. The computer-readable storage medium of claim 15, wherein the computer system being caused to predict and thereby produce the prediction of the demand includes being caused to predict and thereby produce the prediction of the demand based on a total in-service lifecycle of the aircraft from the aircraft identifier information, current flight hours or flight cycles of the aircraft from the aircraft utilization information, maintenance tasks involving replacement of the aircraft parts from the task cards, part numbers of the aircraft parts from the AIPC, and maintenance intervals for tasks from the MPD.

20. The computer-readable storage medium of claim 15, wherein the composite dataset further includes data of historical aircraft part consumption, and
    wherein the computer system being caused to predict and thereby produce the prediction of the demand includes being caused to predict and thereby produce the prediction of the demand based on historical consumption of the aircraft parts from the data of historical aircraft part consumption.

21. The computer-readable storage medium of claim 15, wherein the prediction further includes a likelihood of replacing the aircraft parts with the replacement aircraft parts, the likelihood being indicated by a relevancy index based on a plurality of weighted factors that provide information of the aircraft parts used during a past time period.

\* \* \* \* \*